United States Patent
Yu et al.

(10) Patent No.: US 12,422,885 B2
(45) Date of Patent: Sep. 23, 2025

(54) FOLDABLE ELECTRONIC DEVICE

(71) Applicant: Acer Incorporated, New Taipei (TW)

(72) Inventors: Jui-Yi Yu, New Taipei (TW);
Chun-Hsien Chen, New Taipei (TW);
Hui-Ping Sun, New Taipei (TW);
Chun-Hung Wen, New Taipei (TW);
Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 287 days.

(21) Appl. No.: 18/311,906

(22) Filed: May 4, 2023

(65) Prior Publication Data

US 2024/0111330 A1   Apr. 4, 2024

(30) Foreign Application Priority Data

Oct. 4, 2022  (TW) .................................. 111137721

(51) Int. Cl.
*G06F 1/16*        (2006.01)

(52) U.S. Cl.
CPC .......... *G06F 1/1616* (2013.01); *G06F 1/1679* (2013.01); *G06F 1/1681* (2013.01)

(58) Field of Classification Search
CPC .... G06F 1/1616; G06F 1/1679; G06F 1/1681; G06F 1/1618; G06F 1/162; G06F 1/1637; G06F 1/1683
See application file for complete search history.

(56) References Cited

U.S. PATENT DOCUMENTS

| | | | | |
|---|---|---|---|---|
| 8,988,863 B2* | 3/2015 | Hung | ................... | G06F 1/1601 361/679.08 |
| 9,261,905 B2* | 2/2016 | Shih | ....................... | G06F 1/162 |
| 9,612,624 B2* | 4/2017 | Yang | ..................... | G06F 1/1669 |
| 10,146,269 B2* | 12/2018 | Park | ..................... | G06F 1/1681 |
| 10,303,212 B2* | 5/2019 | Wang | ..................... | G06F 1/1683 |
| 10,528,085 B2* | 1/2020 | Zhang | .................... | G06F 1/169 |
| 10,936,020 B2* | 3/2021 | Chang | ................... | G06F 1/1692 |
| 11,422,593 B2* | 8/2022 | Perelli | .................. | G06F 1/1649 |
| 12,153,474 B2* | 11/2024 | Tsai | ....................... | G06F 1/162 |
| 2014/0292646 A1* | 10/2014 | Kawamoto | .......... | G06F 1/1677 345/156 |
| 2016/0048176 A1* | 2/2016 | Saito | .................... | G06F 1/1681 16/302 |
| 2021/0096597 A1* | 4/2021 | Balaji | .................. | G06F 1/1654 |

(Continued)

*Primary Examiner* — Rockshana D Chowdhury
(74) *Attorney, Agent, or Firm* — JCIPRNET (57) ABSTRACT

A foldable electronic device is provided, including a first body, a second body, a supporting member, a first hinge connecting the first body and the supporting member, a second hinge connecting the supporting member and the second body, and a gravity-type latch movably disposed in the supporting member. The first body and the supporting member are rotated relatively to be folded or unfolded via the first hinge, and the second body and the supporting member are rotated relatively to be folded or unfolded via the second hinge. In a transforming process of the first body folding to the supporting member and together unfolding relative to the second body, the gravity-type latch is latched onto the first body once the unfolding angle is less than a predetermined value, and the gravity-type latch is de-latched from the first body once the unfolding angle is equal to or greater than the predetermined value.

10 Claims, 6 Drawing Sheets

(56) References Cited

U.S. PATENT DOCUMENTS

| | | | |
|---|---|---|---|
| 2021/0112673 A1* | 4/2021 | Huttula | G06F 1/1641 |
| 2022/0051594 A1* | 2/2022 | Eguchi | G06F 1/1607 |
| 2022/0228697 A1* | 7/2022 | Huang | F16M 11/10 |
| 2024/0264953 A1* | 8/2024 | Chu | G06F 13/10 |

* cited by examiner

FOLDABLE ELECTRONIC DEVICE

CROSS-REFERENCE TO RELATED APPLICATION

This application claims the priority benefit of Taiwan application serial no. 111137721, filed on Oct. 4, 2022. The entirety of the above-mentioned patent application is hereby incorporated by reference herein and made a part of this specification.

BACKGROUND

Technical Field

The disclosure relates to a foldable electronic device.

Description of Related Art

With the increase of usage scenarios, the existing notebook computers have various corresponding folded states to cope with the above scenarios, such as normal notebook mode, tablet mode, and tent mode. However, with the increase of the aforementioned demands, the design of the transforming mechanism of the bodies is also becoming more complex, so as to achieve the transformation between the above states, and to ensure that the transforming process goes smoothly without the interference of the structures.

Based on the above, how to provide a simple and easy-to-implement transforming mechanism for the bodies to fold has become a problem that those skilled in the art need to consider and solve.

SUMMARY

The disclosure provides a foldable electronic device, which uses a gravity-type latch to make the process of folding and transforming the bodies go smoothly, and to avoid the situation of the interference of the structures caused by operation.

The foldable electronic device of the disclosure includes a first body, a second body, a supporting member, a first hinge, a second hinge, and a gravity-type latch. The first hinge connects the first body and the supporting member, so that the first body and the supporting member are rotated relatively to be folded or unfolded. The second hinge connects the second body and the supporting member, so that the second body and the supporting member are rotated relatively to be folded or unfolded. The gravity-type latch is movably disposed in the supporting member. In a transforming process of the first body folding to the supporting member and together unfolding relative to the second body, the gravity-type latch is latched onto the first body in response to the unfolding angle of the first body and the supporting member relative to the second body being smaller than a predetermined value, to hinder relative rotation of the first body and the supporting member. The gravity-type latch is de-latched from the first body through gravity in response to the unfolding angle being equal to or greater than the predetermined value, to enable the relative rotation of the first body and the supporting member.

Based on the above, the foldable electronic device provides different folding states and transforming mechanisms for the first body, the second body, and the supporting member through the dual hinges. In order to make the transforming process go smoothly without causing the interference of the structures, the gravity-type latch is further disposed in the supporting member of the foldable electronic device, so that during the transforming process of the first body and the supporting member together unfolding relative to the second body, the gravity-type latch moves as the posture of the supporting member is changed, achieving the effect of being latched onto the first body or being de-latched from the first body. This is to ensure that when the second body is not on the rotation path of the first body, the latching relationship between the supporting member and the first body may be de-latched, thus improving the convenience of the operation of the foldable electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
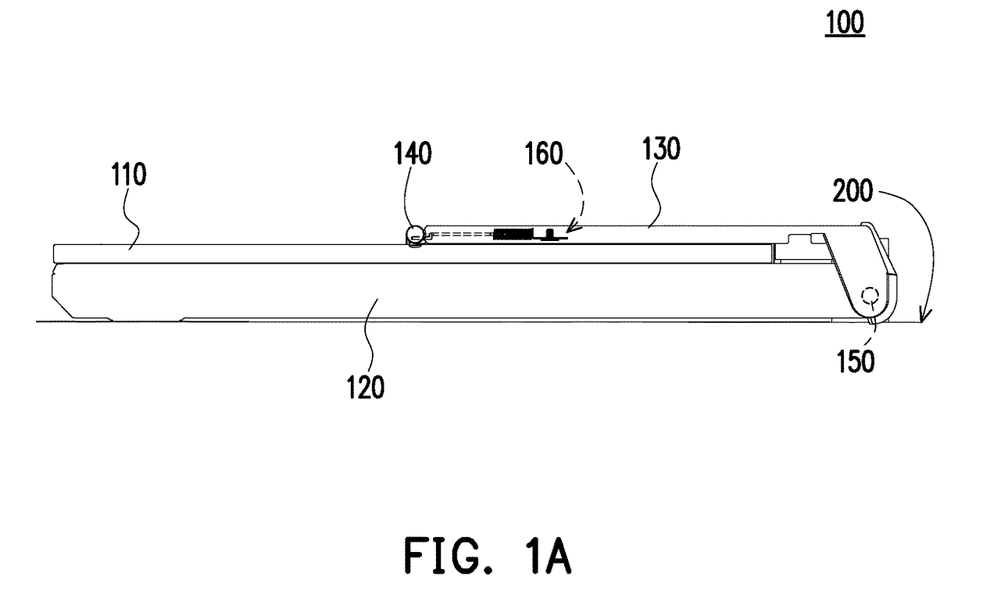
FIG. 1A to FIG. 1C are schematic side views illustrating a foldable electronic device in different states.
Figure 1B:
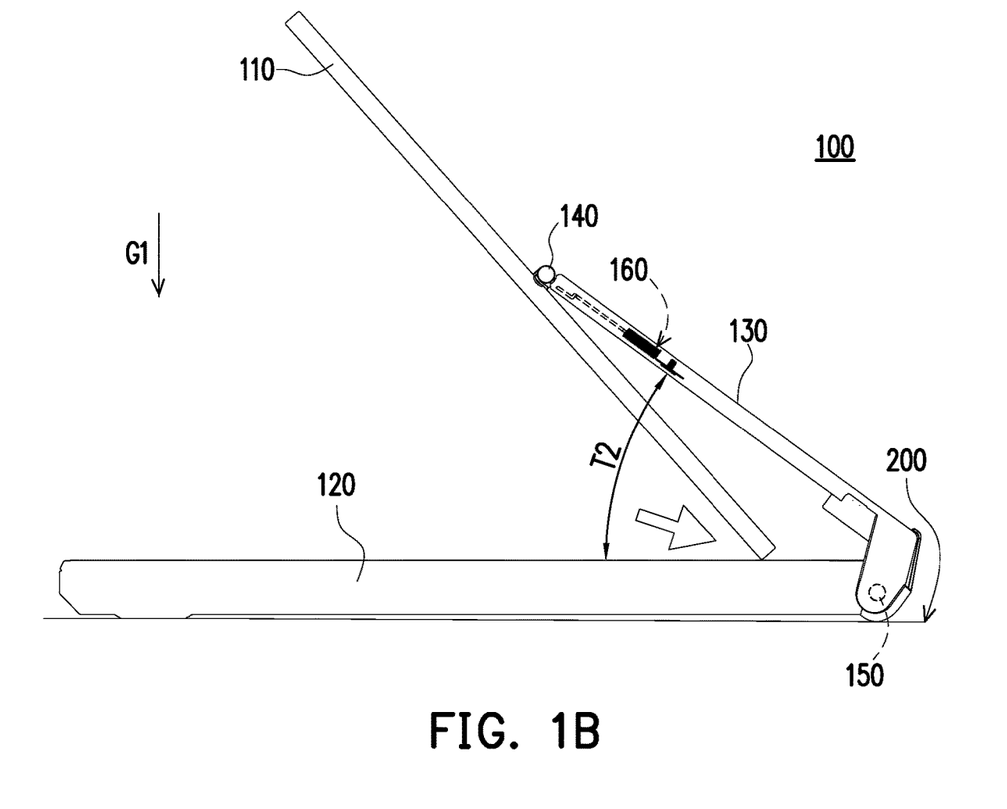
Figure 1C:
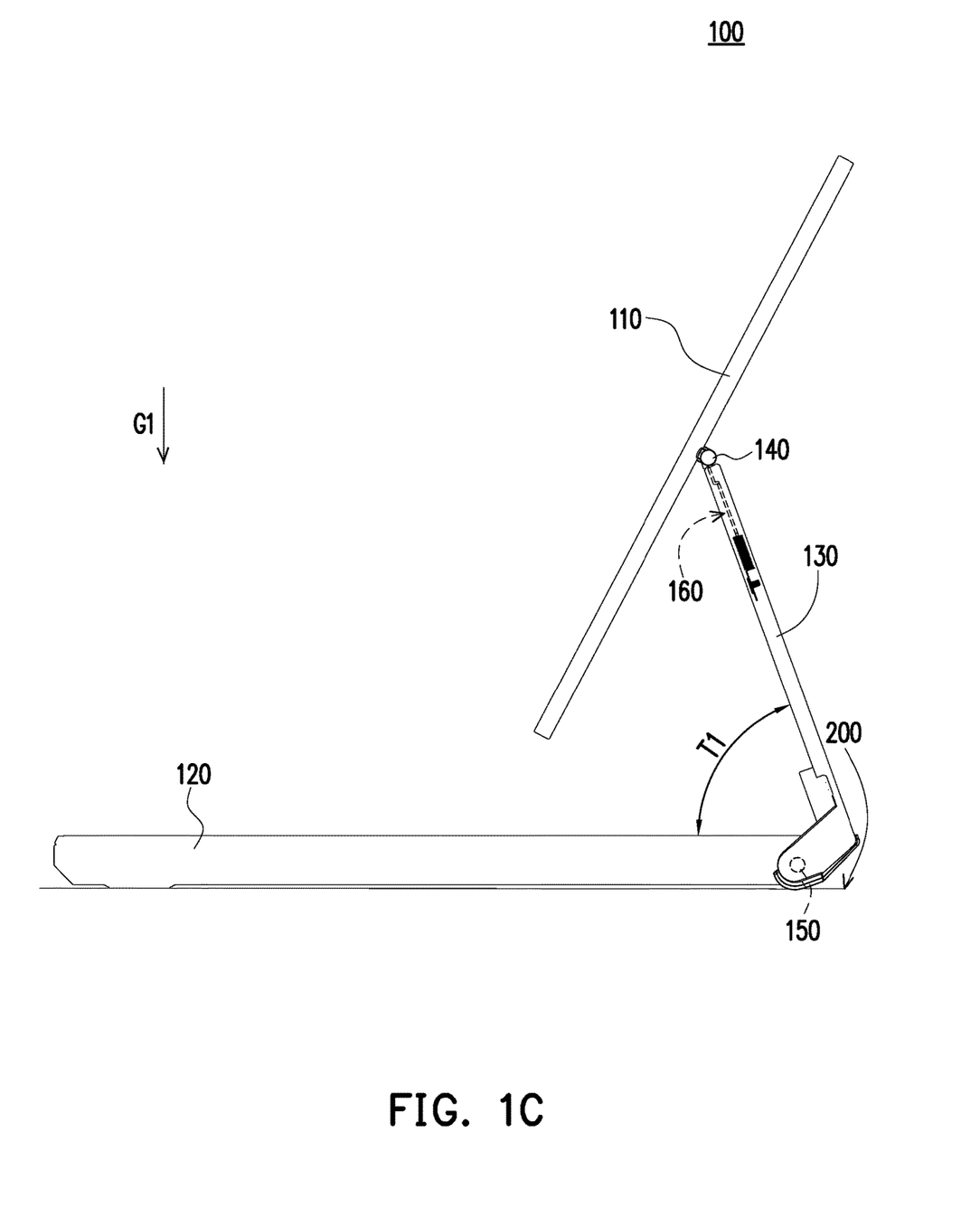

FIG. 1A to FIG. 1C are schematic side views illustrating a foldable electronic device in different states. Please refer to FIG. 1A to FIG. 1C simultaneously. A foldable electronic device 100 of this embodiment includes a first body 110, a second body 120, a supporting member 130, a first hinge 140, a second hinge 150, and a gravity-type latch 160. It should be noted that FIG. 1A to FIG. 1C only roughly illustrate the gravity-type latch 160 in order to show the corresponding relationship with other components, and the gravity-type latch 160 will later be described in detail in other figures.

In this embodiment, the first hinge 140 connects the first body 110 and the supporting member 130, so that the first body 110 and the supporting member 130 are rotated relatively to be folded or unfolded. The second hinge 150 connects the second body 120 and the supporting member 130, so that the second body 120 and the supporting member 130 are rotated relatively to be folded or unfolded. Here, the axis of the first hinge 140 is substantially parallel to the axis of the second hinge 150. The gravity-type latch 160 is movably disposed in the supporting member 130. In a transforming process of the first body 110 folding to the supporting member 130 and together unfolding relative to the second body 120 (the transforming process mentioned here is the process of FIG. 1A transforming to FIG. 1B or to FIG. 1C), the gravity-type latch 160 is latched onto the first body 110 in response to the unfolding angle of the first body 110 and the supporting member 130 relative to the second body 120 being smaller than a predetermined value, thus hindering the relative rotation of the first body 110 and the supporting member 130. The gravity-type latch 160 is de-latched from the first body 110 through gravity in response to the unfolding angle being equal to or greater than the predetermined value, thus enabling the relative rotation of the first body 110 and the supporting member 130.

It should also be noted that, although FIG. 1B includes relevant components of this embodiment, yet disposition conditions thereof are not optimized, so the desired effect of this embodiment is not achieved for the time being, which will be further described later. On the contrary, FIG. 1C shows an optimized foldable electronic device 100 of this embodiment, which achieves the desired effect. That is, in response to the unfolding angle being equal to or greater than the predetermined value (equivalent to an unfolding angle T1), the gravity-type latch 160 is de-latched from the first body 110 through gravity, so that the first body 110 and the supporting member 130 are rotated relatively via the first hinge 140 without any possibility of the interference of the bodies. In this embodiment, the unfolding angle T1 is 36 degrees, and the unfolding angle T2 is 70 degrees.

Figure 2:
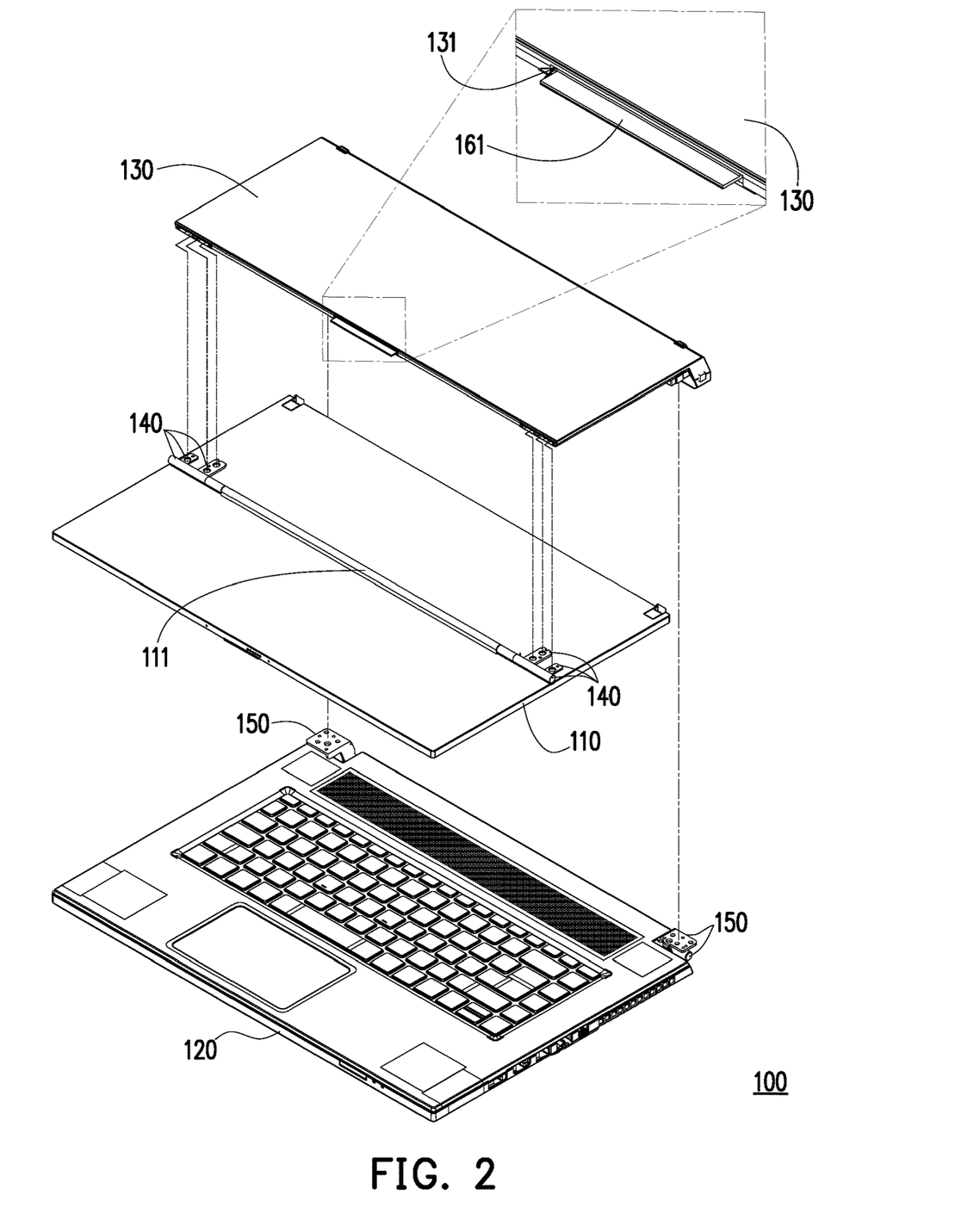
FIG. 2 is an exploded view of a foldable electronic device.
Figure 3:
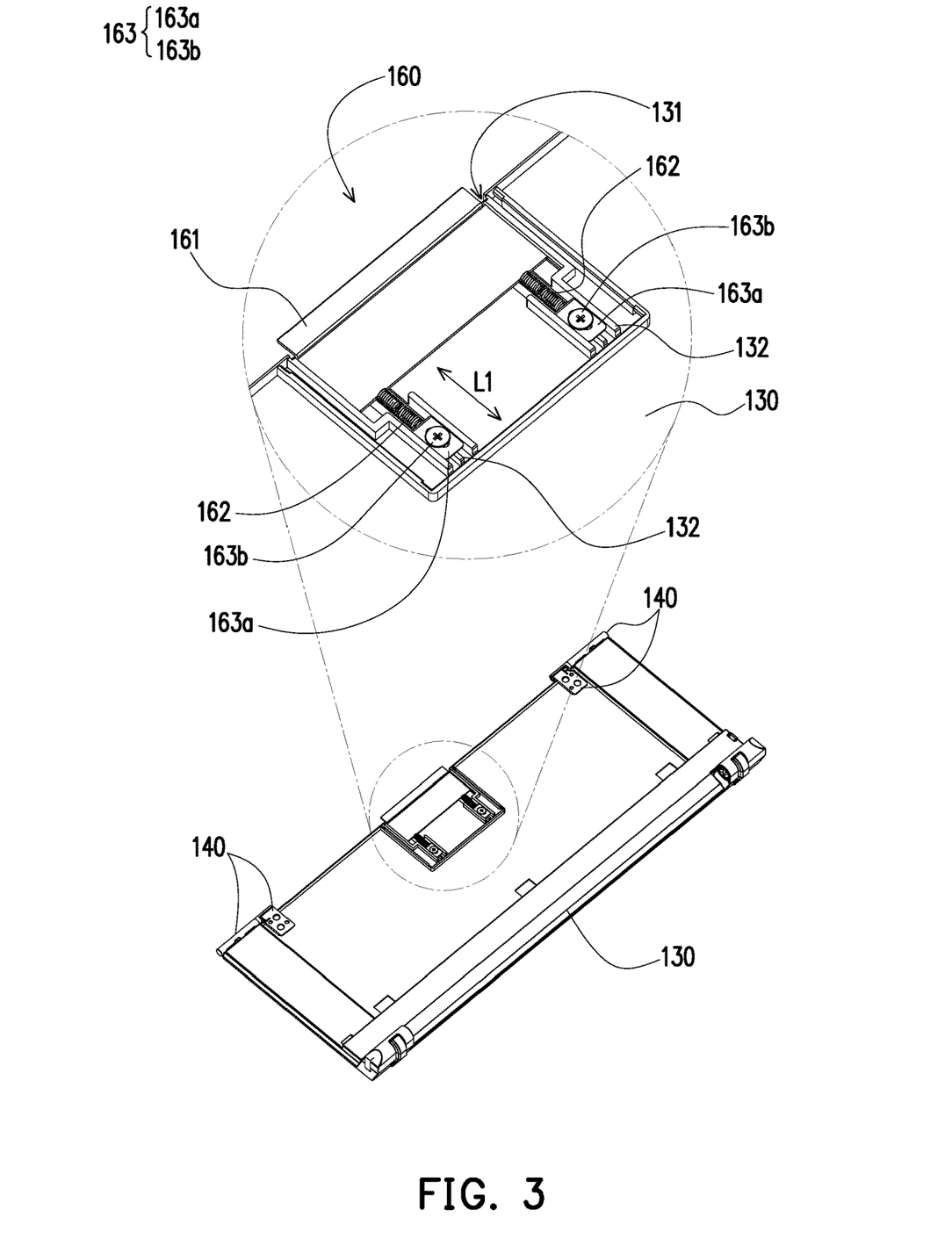
FIG. 3 is a schematic view illustrating a partial structure of a foldable electronic device from another point of view.
Figure 4:
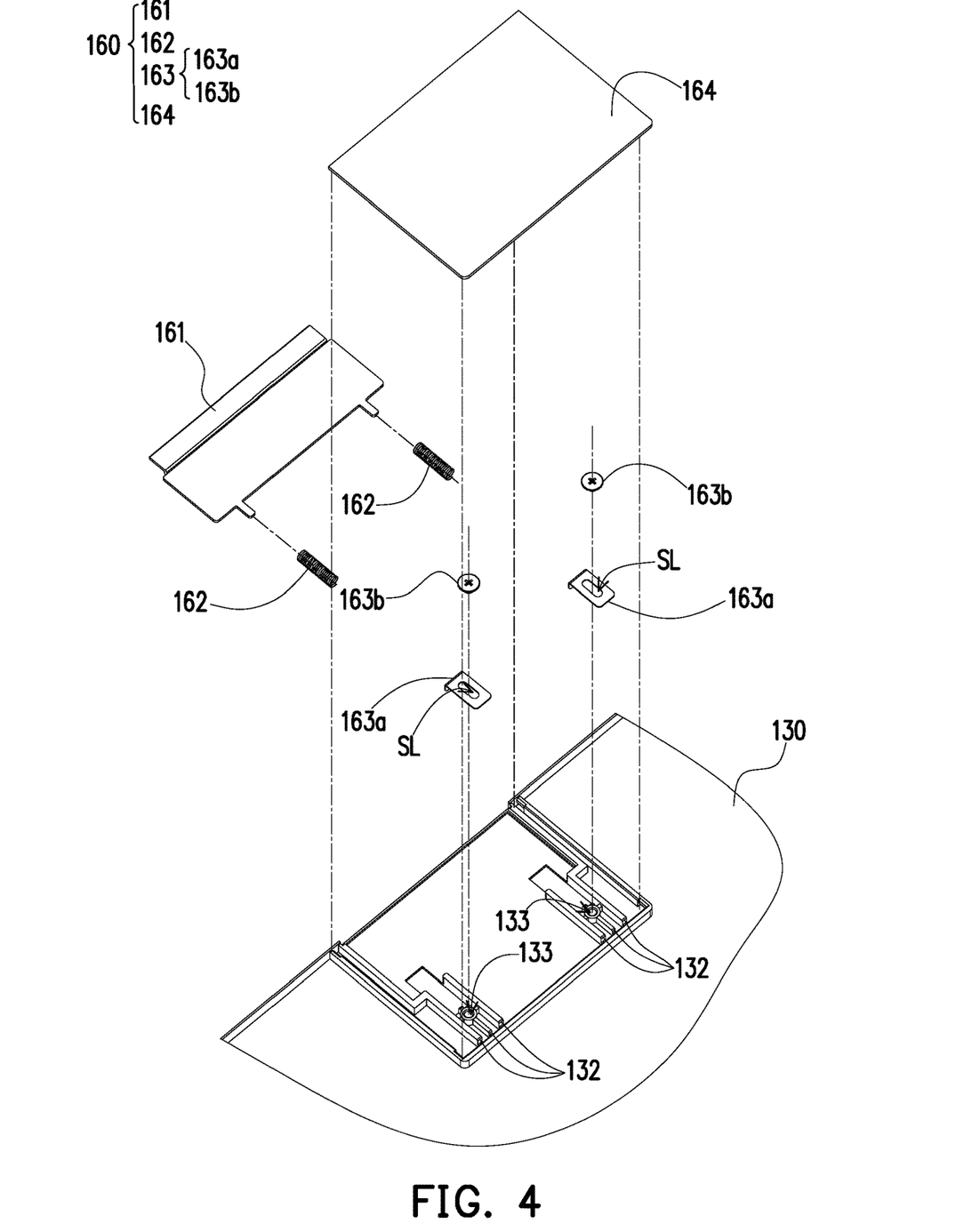
FIG. 4 is an exploded view of the partial structure in FIG. 3.

FIG. 2 is an exploded view of the foldable electronic device. FIG. 3 is a schematic view illustrating a partial structure of the foldable electronic device from another point of view. FIG. 4 is an exploded view of the partial structure in FIG. 3, wherein a cover 164 of FIG. 4 is omitted. Please refer to FIG. 2 to FIG. 4 simultaneously. In this embodiment, the gravity-type latch 160 includes a tenon 161 and at least one elastic member 162, and two springs are used as the elastic members 162 here, for example. The elastic members 162 abut between the tenon 161 and the supporting member 130. In response to the unfolding angle being smaller than the predetermined value, the tenon 161 is driven by the elastic members 162 to be latched onto the first body 110. Conversely, the tenon 161 is de-latched from the first body 110 and deforms (compresses) the elastic members 162 through gravity.

As shown in FIG. 2 and FIG. 3, the gravity-type latch 160 is disposed on the inner surface of the supporting member 130, and the part of the tenon 161 protruding from the opening 131 of the supporting member 130 (as shown in FIG. 2) when driven by the elastic members 162 is the part where the shaft unit 111 of the first body 110 is latched. In this embodiment, the shaft unit 111 of the first body 110 is substantially coaxial with the pair of first hinges 140, and the shaft unit 111 is located between the pair of first hinges 140.

Please refer to FIG. 3 and FIG. 4 again, the inner surface of the supporting member 130 is provided with a cavity and a plurality of rib tracks 132 located in the cavity, and the gravity-type latch 160 further includes at least one adjusting assembly 163 (this embodiment uses a pair of the adjusting assemblies 163 as an example) and the cover 164. The adjusting assemblies 163 are disposed on the supporting member 130 and particularly fixed on the rib tracks 132. One end of the elastic member 162 is fitted to a protruding part of the tenon 161, and the other end is abutted to the adjusting assembly 163. Further, each of the adjusting assemblies 163 includes a fixed unit 163a and a locking unit 163b. The elastic member 162 is abutted between the tenon 161 and the fixed unit 163a, and the fixed unit 163a has a reaming slot SL. The locking units 163b pass through the reaming slots SL to lock the fixed units 163a to the supporting member 130. The elastic members 162 change positions on the supporting member 130 along with the fixed units 163a, wherein the extending direction of the reaming slots SL, the moving direction L1 of the tenon 161, and the deforming direction of the elastic members 162 are consistent with one another.

Further, the supporting member 130 also has lock holes 133 located beside the rib tracks 132, and the fixed units 163a may move along the rib tracks 132 when the fixed units 163a are not fixed by the locking units 163b. Once the locking units 163b pass through the reaming slots SL and are locked to the lock holes 133, the fixed units 163a are fixed beside the rib tracks 132. In other words, the adjusting assemblies 163 can adjust the positions of the fixed units 163a on the rib tracks 132 as described above. This further adjusts the positions of the elastic members 162 and the tenon 161 on the supporting member 130. The cover 164 covers the cavity to shield the components (the tenon 161, the elastic members 162, the adjusting assemblies 163, the rib tracks 132, and the lock holes 133) in the cavity.

Figure 5A:
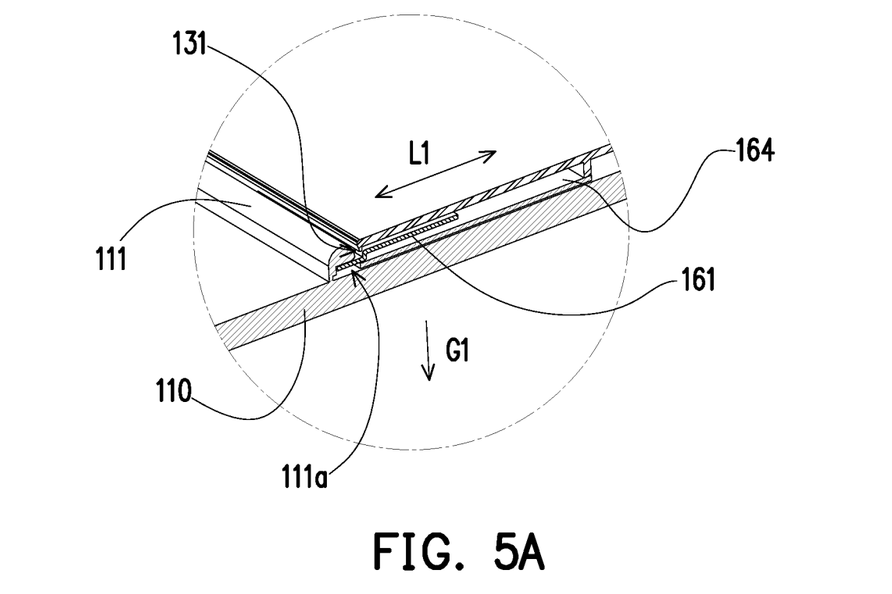
FIG. 5A and FIG. 5B are schematic views respectively illustrating the forms of action of a gravity-type latch.
Figure 5B:
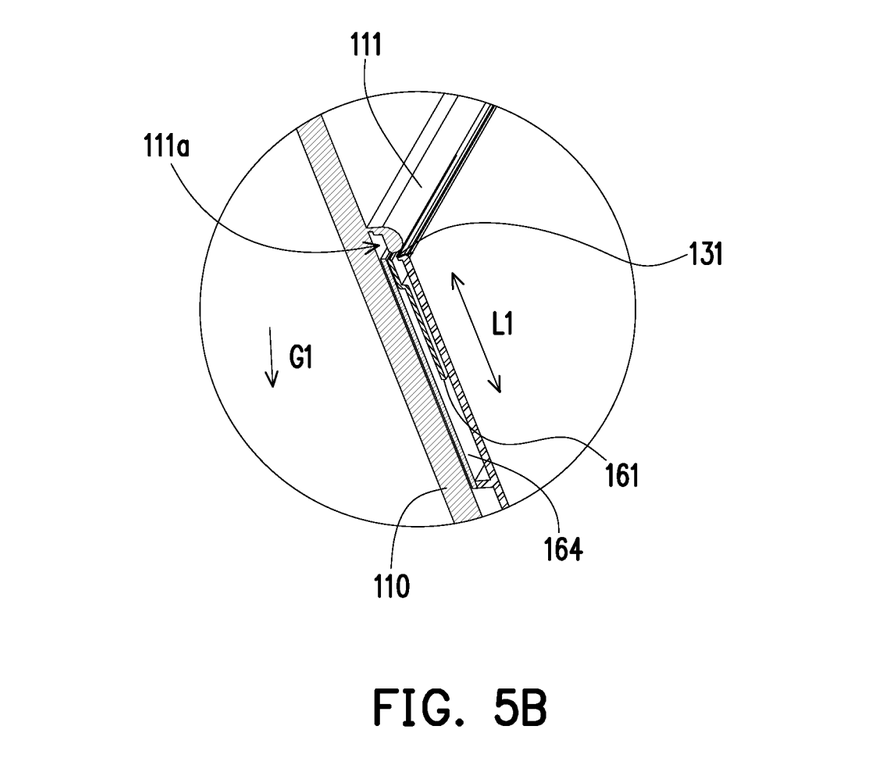

FIG. 5A and FIG. 5B respectively illustrate forms of action of the gravity-type latch, wherein FIG. 5A reflects the state of FIG. 1A or FIG. 2, and FIG. 5B reflects the state of FIG. 1C. In this embodiment, the shaft unit 111 of the first body 110 has a groove 111a, and the part of the tenon 161 protruding from the supporting member 130 is the part to reach into the groove 111a, making the part of the tenon 161 protruding from the supporting member 130 interfere with the groove 111a, thus latching the tenon 161 onto the first body 110, and hindering the relative rotation of the first body 110 and the supporting member 130.

It can be clearly seen from the mechanism of the gravity-type latch 160 shown in FIG. 3 and FIG. 4 that when the foldable electronic device 100 is in the state shown in FIG. 1A, that is, when the second body 120 is carried on a horizontal platform 200, and the first body 110 and the supporting member 130 are folded to the second body 120, the tenon 161 is also substantially horizontal with the supporting member 130. Therefore, the weight of the tenon 161 (along the direction of gravity G1) does not generate a component force in the moving direction L1 of the tenon 161 (and the two are substantially orthogonal to each other). That is, the weight of the tenon 161 does not exert a force on the elastic members 162 at this time. In other words, the tenon 161 at this time is driven by the elastic force of the elastic members 162 to be pushed toward the groove 111a, thus is latched onto the first body 110.

Afterward, when the first body 110 and the supporting member 130 are rotated relatively and unfold to the second body 120, that is, the aforementioned transforming process, the component force of the weight of the tenon 161 along the moving direction L1 gradually increases, so as to exert pressure in the elastic members 162 gradually, thereby overcoming the elastic force of the elastic members 162. During the transforming process, the moving direction L1 of the tenon 161 is consistent with the deforming direction of the elastic members 162, and the component force of the weight of the tenon 161 along the moving direction L1 or the deforming direction increases as the unfolding angle increases. Once the unfolding angle reaches or exceeds the predetermined value, the component force of the weight of the tenon 161 along the moving direction L1 exceeds the elastic force of the elastic members 162, making the aforementioned part of the tenon 161 interfering with the groove 111a move into the supporting member 130, so as to release the corresponding relationship with the groove 111a and also exert a force to the elastic members 162 to deform the elastic members 162 at the same time.

As shown in the aforementioned FIG. 1B, if the gravity-type latch 160 is de-latched from the first body 110 (i.e., the tenon 161 exits the groove 111a) before the unfolding angle (e.g., the unfolding angle T2 is 36 degrees) reaches the predetermined value (e.g., the unfolding angle T1 is 70 degrees as shown in FIG. 1C), then the state shown in FIG. 1B occurs. That is, the first body 110 is rotated relative to the supporting member 130 due to the above-mentioned de-latching, thereby causing the interference of the bodies. As indicated by the arrow in FIG. 1B, the first body 110 interferes with the second body 120 due to the rotation. In view of this, the adjusting assemblies 163 of this embodiment are used to adjust the timing of the predetermined value, which is also equivalent to being used to control the timing of the aforementioned unfolding angle, so as to avoid the interference situation in FIG. 1B. In other words, when the unfolding angle T1 shown in FIG. 1C is 70 degrees as the predetermined value, and the unfolding angle T2 shown in FIG. 1B is 36 degrees, it is reasonable to let the tenon 161 still be latched onto the first body 110 in order to avoid the interference of the bodies as shown in FIG. 1B.

The disclosure does not limit the predetermined value of the unfolding angle, which may be determined according to the physical properties of the elastic members 162 (e.g., elastic coefficient), the weight of the tenon 161, and the moving distance required by the tenon 161 for latching/de-latching.

For example, when the adjusting assemblies 163 adjust the tenon 161 and the elastic members 162 to move close to the groove 111a, the unfolding angle has a first predetermined value, and when the adjusting assemblies 163 adjust the tenon 161 and the elastic members 162 to move away from the groove 111a, the unfolding angle has a second predetermined value, wherein the first predetermined value is greater than the second predetermined value. Further, under the same weight of the tenon 161 and the fixed characteristics of the elastic members 162, moving close to the groove 111a means that the movable distance of the tenon 161 along the moving direction L1 is shorter, and the tenon 161 is latched onto the first body 110 at a shorter distance. On the contrary, during the transforming process of unfolding the bodies, it means that the first predetermined value needs to be unfolded to a larger unfolding angle, so that the weight of the tenon 161 generates a larger component force in the moving direction L1 to overcome the elastic force of the elastic members 162.

Comparatively, moving away from the groove 111a means that the movable distance of the tenon 161 along the moving direction L1 is longer, and the tenon 161 is latched onto the first body 110 smoothly when the tenon 161 moves by a longer moving distance. On the contrary, during the transforming process of unfolding the bodies, the first body 110 and the supporting member 130 are unfolded to a smaller unfolding angle (the second predetermined value) relative to the second body 120, and the component force of the weight of the tenon 161 moving along the direction L1 overcomes the elastic force of the elastic members 162 to achieve an effect of de-latching.

From the above example, it is known that when the de-latching is desired to be performed at a larger unfolding angle, the adjusting assemblies 163 can be moved closer towards the groove 111a. Otherwise, the adjusting assemblies 163 can be moved away from the groove 111a.

It should also be mentioned that the configuration of this embodiment uses a pair of elastic members 162 and a pair of adjusting assemblies 163, which also improves the stability of the moving of the tenon 161 and avoids the rotation caused by uneven forces.

To sum up, in the aforementioned embodiments of the disclosure, the foldable electronic device provides different folding states and transforming mechanisms for the first body, the second body, and the supporting member through the dual hinges. In order to make the transforming process go smoothly without causing the interference of the structures, the gravity-type latch is further disposed in the supporting member of the foldable electronic device. During the transforming process in which the first body and the supporting member together unfold relative to the second body, the gravity-type latch moves as the posture of the supporting member changes, so as to achieve the effect of latching onto the first body or de-latching from the first body. This is to ensure that when the second body is not on the rotation path of the first body, the latching relationship between the supporting member and the first body may be de-latched, thus improving the convenience of the operation of the foldable electronic device.

Further, the gravity-type latch includes the tenon and the elastic members that can move within the supporting member, wherein the component force of the weight of the tenon along the moving direction changes as the posture of the supporting member changes. That is, the component force increases as the unfolding angle of the supporting member relative to the second body increases. In this way, the component force of the tenon along the moving direction gradually increases until it offsets the elastic force of the elastic members or even further deforms the elastic members. On the contrary, when the unfolding angle of the supporting member relative to the second body gradually decreases, the component force of the weight of the tenon along the moving direction also gradually decreases, until it no longer exerts a force to the elastic members, so that the elastic members can drive the tenon to move by the elastic force. Based on the above, the movement of the tenon can further be used to latch onto the first body or de-latch from the first body, and in the process of the supporting member being rotated to be folded or unfolded relative to the second body, the effect of latching onto/de-latching from the first body is achieved.

Furthermore, the gravity-type latch also includes the adjusting assemblies for adjusting the unfolding angle of the supporting member relative to the second body, wherein the adjusting assemblies control the length of the movable path of the tenon by changing the position of the elastic members on the supporting member. When a larger unfolding angle is required before de-latching the first body, the elastic members and the tenon may be driven by the adjusting assemblies to move closer to the groove. And vice versa, the elastic members and the tenon may be driven by the adjusting assemblies to move away from the groove.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A foldable electronic device, comprising:
a first body;
a second body;
a supporting member;
a first hinge, connecting the first body and the supporting member, so that the first body and the supporting member are rotated relatively to be folded or unfolded;
a second hinge, connecting the second body and the supporting member, so that the second body and the supporting member are rotated relatively to be folded or unfolded; and a gravity-type latch, movably disposed in the supporting member, wherein in a transforming process of the first body folding to the supporting member and together unfolding relative to the second body, the first body and the supporting member form an unfolding angle relative to the second body, the gravity-type latch is latched onto the first body in response to the unfolding angle being smaller than a predetermined value, to hinder relative rotation of the first body and the supporting member, and the gravity-type latch is de-latched from the first body through gravity in response to the unfolding angle being equal to or greater than the predetermined value, to enable the relative rotation of the first body and the supporting member.

2. The foldable electronic device of claim 1, wherein the gravity-type latch comprises:

a tenon; and at least one elastic member, abutting between the tenon and the supporting member, wherein in response to the unfolding angle being smaller than the predetermined value, an elastic force of the elastic member drives a part of the tenon to move into a groove of the first body to be latched onto the first body, and in response to the unfolding angle being equal to or greater than the predetermined value, the part of the tenon exits the groove and deforms the elastic member through gravity.

3. The foldable electronic device of claim 2, wherein the gravity-type latch further comprises at least one adjusting assembly disposed on the supporting member, wherein the elastic member abuts between the adjusting assembly and the tenon, and the adjusting assembly is configured to change positions of the tenon and the elastic member relative to the supporting member.

4. The foldable electronic device of claim 3, wherein in response to the adjusting assembly adjusting the tenon and the elastic member to move close to the groove, the unfolding angle has a first predetermined value, and in response to the adjusting assembly adjusting the tenon and the elastic member to move away from the groove, the unfolding angle has a second predetermined value, wherein the first predetermined value is greater than the second predetermined value.

5. The foldable electronic device of claim 3, wherein the adjusting assembly comprises a fixed unit and a locking unit, wherein the elastic member abuts between the tenon and the fixed unit, the fixed unit comprises a reaming slot, the locking unit passes through the reaming slot and locks the fixed unit to the supporting member, and the elastic member changes the position on the supporting member along with the fixed unit.

6. The foldable electronic device of claim 5, wherein an extending direction of the reaming slot is consistent with a moving direction of the tenon and a deforming direction of the elastic member.

7. The foldable electronic device of claim 5, wherein the supporting member comprises a plurality of rib tracks and a plurality of lock holes, wherein each of the fixed units is movably mounted on some of the rib tracks, and the locking unit passes through the reaming slot and locks at each of the lock holes, so that the fixed unit is fixed on the rib tracks.

8. The foldable electronic device of claim 3, wherein the supporting member comprises a plurality of rib tracks, and the gravity-type latch comprises a plurality of elastic members and a plurality of adjusting assemblies that are respectively disposed on the rib tracks.

9. The foldable electronic device of claim 2, wherein the first body comprises a shaft unit which is coaxial with the first hinge, and the shaft unit comprises the groove.

10. The foldable electronic device of claim 2, wherein during the transforming process, a moving direction of the tenon is consistent with a deforming direction of the elastic member, and a component force of a weight of the tenon along the moving direction or the deforming direction increases as the unfolding angle increases.

* * * * *